(No Model.)
G. W. CAMPBELL.
CORN PLANTER.
No. 458,096. Patented Aug. 18, 1891.
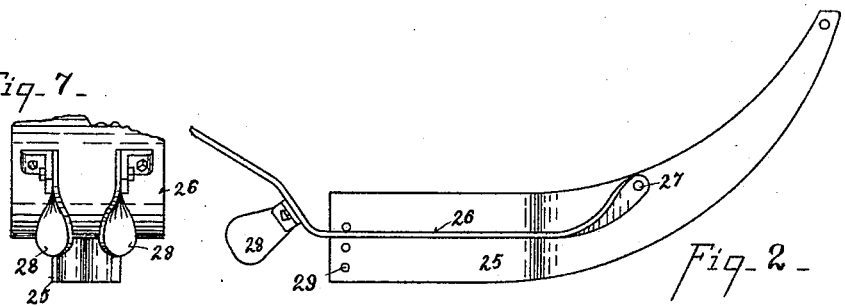
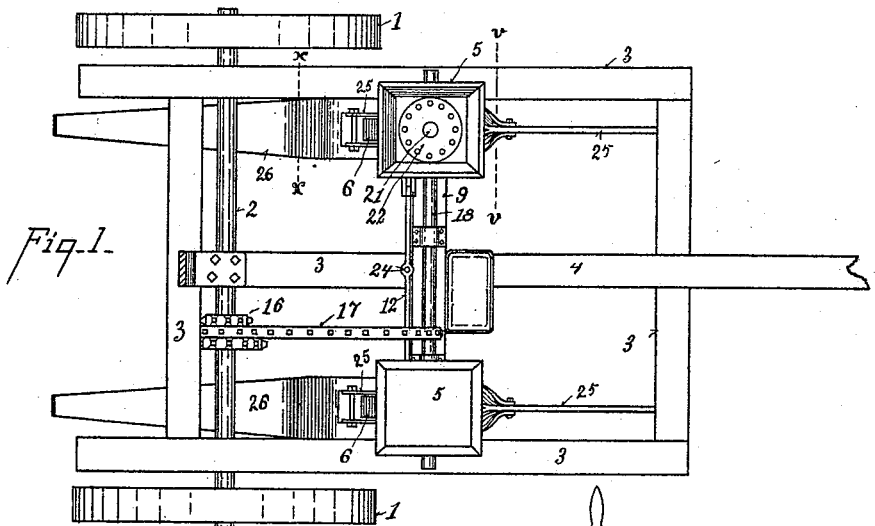
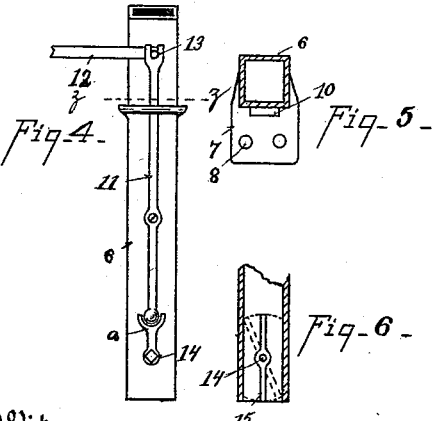
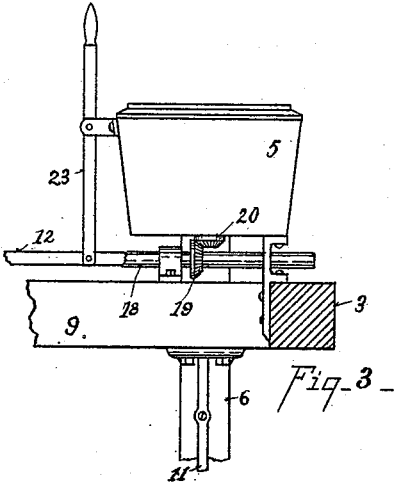
Witnesses
C. W. Miles
T. Simmons
Inventor
George W. Campbell
By his Attorneys Wood & Boyd

UNITED STATES PATENT OFFICE.

GEORGE W. CAMPBELL, OF LIMA, OHIO.

CORN-PLANTER.

SPECIFICATION forming part of Letters Patent No. 458,096, dated August 18, 1891.

Application filed October 6, 1890. Serial No. 367,258. (No model.)

*To all whom it may concern:*

Be it known that I, GEORGE W. CAMPBELL, a citizen of the United States, and a resident of Lima, in the county of Allen and State of Ohio, have invented certain new and useful Improvements in Corn-Planters, of which the following is a specification.

The object of my invention is to provide a novel seed-planter which can be used either as a drill or as a check-row planter without requiring other change than a fastening-bolt or locking attachment, whereby the shoes of the planter can freely rise and fall to conform to the surface traversed without disturbing the practical operation of the seeding mechanism.

To accomplish this object, my invention involves the features of construction, the combination or arrangement of devices, and the principles of operation hereinafter described and claimed, reference being made to the accompanying drawings, in which—

Figure 1 is a plan view of my improvement. Fig. 2 is a side elevation of the covering-shoe. Fig. 3 is a section on line *v v*, Fig. 1. Fig. 4 is a front elevation of one of the dropping-spouts. Fig. 5 is a sectional view of the same on line *z z*. Fig. 6 is a central vertical section of the lower end of the seed-spout. Fig. 7 is a section on line *x x*, Fig. 1.

1 represents the ground-wheels; 2, the axle; 3, the main frame; 4, the tongue, and 5 the seed-boxes.

6 represents the seed-spout. It is provided with the flange or ledge 7, which is pierced with holes 8 for rigidly bolting it to the cross frame piece 9.

10 represents a slot cut in the ledge 7, which serves as guide and stops for connecting-rod 11, the upper end of which is forked to receive the shaker-bar 12, which is connected therewith by means of pin 13, engaging with said fork. The lower end of the connecting-rod engages the crank *a*. I have shown a ball on the connecting-rod 11, engaging with the bifurcated end of the crank *a*, which is the preferred form of pivoting the connecting-rod to the crank.

14 represents a crank-shaft, which forms the axis for the seed-valve 15, to which it is rigidly fastened, and is oscillated by the driving mechanism, as will be hereinafter explained.

16 represents a set of sprocket-wheels. 17 represents a sprocket-chain running thereon. Said sprocket-wheels receive their motion from the main shaft 2, which is locked to the wheels.

19 represents a driving-gear keyed to shaft 18 and engaging with bevel-gear 20.

21 represents the shaft keyed to said bevel-gear 20.

22 represents a seed wheel or disk keyed to shaft 21. It is provided with a series of holes around the periphery. Each hole is designed to carry one seed. Above the seed-wheel is applied the usual cut-off over the seed-spout, which is not shown.

It is very desirable to have a combined check-row-planter and drill which can be readily changed from one to the other without loss of time or disturbing the mechanism. In drilling corn it is necessary to have a continuous positive forced feed. A positive forced feed is also necessary in check-rowing as intervals of deposit are longer, as the corn is usually drilled from ten to sixteen inches apart, while the check-rower plants at intervals of about three and one-half feet. In the former one seed only must be dropped in place, and in the latter from three to four. I employ the same mechanism for check-rowing and drilling. When I desire to check-row, the shaker-arm 23 is reciprocated at appropriate intervals. It is hinged to the shaker-bar 12, which is connected by means of the connecting-rod and crank at either end to the respective valves of the two seed-spouts. When the valve 15 is in the position shown in dotted lines, the seed lodge upon the valve as they are deposited in the spout by the seed-wheel 21. Now when the operator moves the shaker-bar 12 the valve is turned to the opposite side of the seed-spout and the seed dropped out, and the seed-wheels deposit the seed on the opposite side of the valve in a similar manner. The next motion releases that charge and brings the valve again into position shown in dotted lines. Thus a consecutive dropping of three or more seeds at appropriate intervals is accomplished. Now when it is desired to drill the seed the shaker-bar is locked, holding the valve in position shown in full lines, Fig. 6. I have shown a small bolt 24, passing through said bar 12 and connecting it to the tongue 4, as one convenient means of locking the same. When the valve 15 is locked in the position shown in Fig. 6, the seed will pass down the seed-spout through the heel of the shoe and be covered thereby.

In order to appropriately cover the seed and to regulate the depth to which the shoes should penetrate the ground, I provide the following instrumentalities:

25 represents an ordinary shoe with the split heel. It is constructed and hinged to the planter-frame in the usual manner.

26 represents a bifurcated guard, the forks of which are pivoted to the shoe 27. Said guards carry covering-shares 28, which are rigidly attached to the guard 26.

29 represents a series of holes, through which a bolt is interchangeably passed to hold the guard in any desired position for regulating the depth of planting the seed.

It is a very important consideration to have the seed deposited at the proper depth. If deposited too deep, they will be too long in germinating, and if covered too shallow they are apt to not germinate at all if the season be dry. In ordinary ground some portions are more mellow or lighter than others, and without an appropriate device for controlling the depth of planting, the seed is put in at varying depths; but by means of the guard herein described it can be adjusted so that it will not be too deep, and the operator can by exerting pressure by the ordinary contrivance force the shoes into the ground, if desired, and without danger of forcing them in too deep. It is also very important to have the shoes rise and fall with the inequalities of the ground without disturbing the effect of the seeding operation. By employing the main shaft 2, which continuously drives the seed-wheel, and receiving motion through a sprocket-chain, the said runner-frame and the shaft and seed-box may rise and fall freely, for the slack in the sprocket-chain is sufficient to allow these vertical movements of the shoes. At the same time I obtain a positive and continuous motion of the seed-wheels. Of course the ordinary check-rower device can be employed and attached to the shaker-bar, so that the seed can be dropped automatically by the check-rower, or it may be dropped continuously as in drilling by fastening the shaker-bar vertically, or an operator may be employed to ride the machine and check-row by hand. It is also very important in depositing seed in hills for check-rowing to throw the valve quick, so as to deposit the seed in a bunch instead of scattering it, which it is apt to do if the valve motion is slow. I obviate this difficulty by means of the crank $a$, operated by the pivoted connecting-rod. This crank $a$ and connecting-rod 11 have sufficient lost motion by means of the ball-and-socket joint connection to prevent the shock which would be occasioned if the valve was connected directly to the connecting-rod 11, which has hitherto been the practice in operating such valves. By my construction the flange 7, being pierced to form a guide for the connecting-rod 11, also serves as an appropriate stop for the same. This construction also enables the shaker-bar to be properly operated by the check-rower device, and I believe it to be an important improvement in the construction of corn-planters.

It is important that the covering-shoes 28 should be sufficiently in rear of the heel of the shoe to allow clods to pass out freely and prevent them from being caught between the covering-shoes, which would destroy their efficiency. In my said former patent these covering-shoes were attached to the runner, causing them to enter the ground at varying depths, due to the rising and falling of the runners, but by hinging these covering-shoes to the runners and by having the space between the adjusting-pins the shoe will rise and fall freely without affecting the depth of covering, and is an important improvement over my said former invention. This part of my invention is an improvement upon Letters Patent No. 431,935, granted me July 8, 1890, and contains very important advantages over said patented invention, in that it can readily be applied to an ordinary shoe, so that parties who have an ordinary corn-planter shoe can readily attach this improvement thereto.

Having described my invention, what I claim is—

1. In a corn-planter, the combination, with the main driving-shaft 2, of the seed-wheel shaft driven by sprocket-wheels and chain operating the seed-wheels for depositing seed in the spout 6, which is provided with a valve 15, adapted to be operated by the connecting-rod 11, and the crank $a$, upon the axis of which said valve is mounted, substantially as specified.

2. In combination with a corn-planter having a continuous forced-feed drilling device, the seed-spout 6, provided with valve 15, operated by the crank $a$, connecting-rod 11, shaker-bar 12, and the locking device 24 for holding said valve as an idler for continuous drilling, substantially as specified.

3. In a corn-planter, in combination with the seed-spout 6, and a valve 15 mounted therein upon an axis operated by crank $a$, having a loose connection with rod 11 on the outside of the seed-spout, and a flange 7, provided with stops 10 on either side of the connecting-rod, substantially as specified.

4. In combination with the seed-shoe hinged to a planter, the bifurcated guard 26, hinged to the shoe and carrying at the rear ends covering-shoes 28, located some distance beyond the heel of the shoes, substantially as described.

In testimony whereof I have hereunto set my hand.

GEORGE W. CAMPBELL.

Witnesses:
T. SIMMONS,
C. W. MILES.